E. SCHMID.
COOKING UTENSIL.
APPLICATION FILED APR. 13, 1912.
1,074,647.
Patented Oct. 7, 1913.
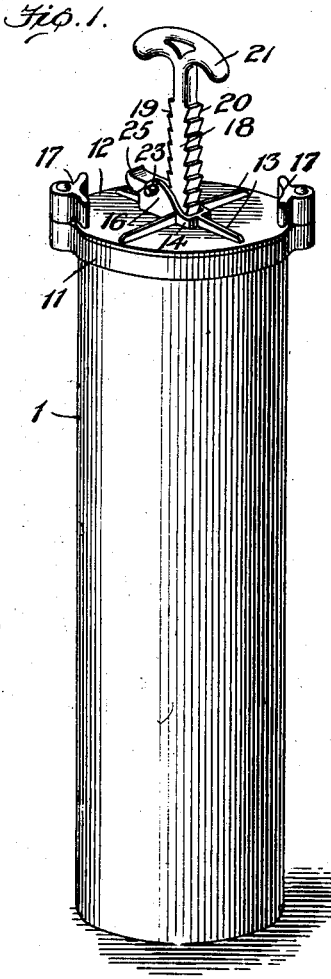
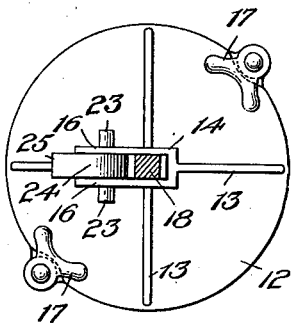
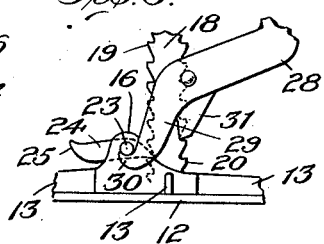
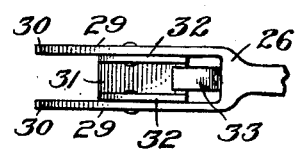
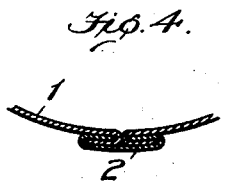
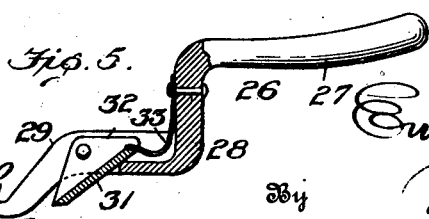
Witnesses
Edwin T. Bradford
G. A. Ritter
Inventor
Emil Schmid
By Wm. E. Dyre
Attorney

UNITED STATES PATENT OFFICE.

EMIL SCHMID, OF TWINING CITY, DISTRICT OF COLUMBIA.

COOKING UTENSIL.

1,074,647.  Specification of Letters Patent.  Patented Oct. 7, 1913.

Application filed April 13, 1912. Serial No. 690,635.

*To all whom it may concern:*

Be it known that I, EMIL SCHMID, a citizen of the United States, residing at Twining City, in the District of Columbia, have invented certain new and useful Improvements in Cooking Utensils; and I do hereby declare the following to be a full, clear, and exact description of the invention, such as will enable others skilled in the art to which it appertains to make and use the same.

My invention relates to cooking utensils, but has particular reference to improved means for cooking boned ham, shoulders of pork or other meats, and has for its object the production of a simple, efficient, and economical apparatus designed and adapted to preserve all of the meat juices and flavors during the process of cooking, to increase its nutritious value as an article of food, to speedily and effectually compress the meat previous to cooking thereby closing the space formerly occupied by bone, to maintain it under suitable pressure during the process of cooking without resorting to the tedious and uncertain method of cording or binding with twine, to prevent shrinkage of the meat after cooking, to prevent the water in which the boiling or cooking occurs from coming in contact with the meat or robbing it of its flavor, and to render the cooked product more convenient and economical for carving.

To these and other uses the present invention is adapted, but the use for which it is especially designed is that of cooking boned ham and shoulders of pork so as to retain them in convenient form for handling, and to preserve their juices and aroma.

The invention will be hereinafter particularly described and pointed out in the claims following, the process of cooking a ham previously boned being set forth as an exemplification of its uses.

In the accompanying drawings which form part of this application and whereon corresponding reference numerals indicate like parts in the several views: Figure 1 represents a perspective view of the invention closed and ready for use. Fig. 2 is a longitudinal vertical section taken centrally through the structure. Fig. 3 is a top plan view the central compression ratchet bar being in section. Fig. 4 is a detailed sectional view showing a form of lap joint for the cylindrical body of cooker. Fig. 5 is a side elevation partly in section of an operating tool. Fig. 6 is a fragmentary view in side elevation showing one end of said tool in operative position, and Fig. 7 is a plan of the tool parts shown by Fig. 6.

Reference being had to the drawings and numerals thereon, 1 indicates a meat receptacle or cooker preferably of sheet metal and of cylindrical form its longitudinal edges being connected by an ordinary lap seam joint 2 such as shown by Fig. 4. At its lower end the receptacle 1 is provided with an interior shoulder annular flange or offset 3 upon which rests a removable bottom closure 4 conforming in shape to the interior of receptacle 1 and preferably of cast iron having downwardly projecting cross webs or flanges 5, 5 for strengthening purposes. Within the meat receptacle 1 is a vertically movable plunger 6, also by preference of cast iron, having a slightly concaved under surface 7 and an upstanding annular flange 8 serving to guide the plunger by contact with the interior walls of the receptacle 1, while at its center this plunger is provided with an integral boss 9 having a surface depression 10 therein for purposes which will later appear. To the upper edge of receptacle 1 is secured an exterior top ring 11, and upon this rests a flanged top cover 12, also preferably of cast iron reinforced upon its upper surface by cross webs or flanges 13, 13, and having integral therewith a hollow boss 14 of rectangular form bordering on aperture 15 through the center thereof, the said flanges merging into a pair of parallel upstanding lugs 16, 16 as best shown by Figs. 1 and 3 of the drawings. As a means of removably securing top cover or closure 12 in position upon the upper end of receptacle 1 lock wings 17, 17 are employed at points diametrically opposite, same being pivotally secured to the surrounding top ring 11 and adapted, when turned horizontally, to close over the edges of cover 12 as shown by Figs. 1 and 3. Projecting downwardly through aperture 15 is a double ratchet bar or presser bar 18 having two sets of ratchet teeth 19 and 20 upon opposite edges thereof, a handle 21 at its upper end and a conical lower end 22 bearing in depression 10 of the plunger 6 aforesaid. And it will be noted that aperture 15 through the center of cover 12 is of greater cross sectional area than that of the ratchet bar projecting upward through said aperture, thereby permitting the ready withdrawal of said ratchet bar when occasion requires.

Extending transversely through lugs 16, 16 upon top cover 12 is a pawl pin 23 projecting upon each side of said lugs as clearly shown by Fig. 3, and upon this pin, intermediate the lugs, is pivotally mounted a ratchet pawl 24 having an overbalanced outwardly extending tail 25 serving by gravity to normally retain the operative end of said pawl in engagement with teeth 19 of the ratchet bar.

The numeral 26 indicates a hand lever for forcibly depressing the ratchet bar 18, this lever by preference is of wrought or malleable iron comprising a handle 27, an angular depending portion 28 and a bifurcated operating end 29 terminating in a pair of hooks 30, 30 adapted when in use to straddle the ratchet bar 18 and fulcrum this lever beneath the projecting ends of the pawl pin 23, as shown by Fig. 6. Between the bifurcated members 29 of lever 26 is pivoted a push pawl comprising a base or body portion 31 and a pair of oppositely disposed uprising angular ears 32, 32 by which it is pivotally connected upon opposite sides, thereby allowing clearance for the ratchet bar 18 when lever 26 is elevated to its uppermost position as in Fig. 6 of the drawings. While as shown by Fig. 5 the said push pawl 31 is normally retained in operative position by a leaf spring 33 bearing upon the rear end thereof and in turn securely fastened to the angular depending portion 28 of the lever 26.

This being a description of my invention its operation when applied to the cooking of ham, for example, from which the bone has been removed is substantially as follows: The bottom closure 4 being first introduced into the cylindrical receptacle 1 as indicated by Fig. 2, is followed by the meat $x$ to be cooked, upon this in like manner is placed the plunger 6. The top cover or closure 12 is next secured upon the upper edge of said receptacle by agency of the lock wings 17, 17, the ratchet bar 18 being introduced through aperture 15 with its lowermost end 22 resting in the central plunger depression or pocket 10. In this relation of parts it will be seen that ratchet pawl 24 engages one set of teeth 19 on the ratchet bar 18, and force applied to handle 21 partially compresses the meat $x$ below plunger 6 in a speedy and expeditious manner. When additional compression is required, the hook ends 30, 30 of hand lever 26 are engaged beneath ends of the pawl pin 23 with the spring pressed push pawl 31 in position to engage teeth 20 of the ratchet bar, whereupon repeated movement of said lever 26, by agency of its pawl 31, serves to quickly depress said ratchet bar and plunger to the desired extent, any accidental upward or retrograde movement being positively prevented by action of the ratchet pawl 24 as aforesaid. This accomplished, the entire utensil with its contents is practically submerged in a suitable water-filled boiler, the temperature raised to the boiling point and there maintained for period of time sufficient to insure the thorough cooking of the meat $x$, whereafter it is removed by a reversal of the operation heretofore described. During this operation it will be noted that all joints between the interior of receptacle 1, its bottom closure 4, and the plunger 6 are effectually sealed by compression of the meat in process of cooking, so that no liquid is admitted to dilute the natural juices thereof, nor is the characteristic flavor of the meat lost by evaporation or otherwise.

It will be noted further that meat cookers of the character hereinbefore described are generally used in large numbers in preparing meats for commercial purposes, a large boiler (not shown) being employed in connection; and, for this reason it is important that means be provided for speedily charging, closing and opening the individual receptacles. For this reason also experience has demonstrated the advantages of an operating hand lever, such as that herein shown and described, having an upwardly extending angular portion 28 to facilitate operating cookers which may be centrally positioned in the boiler, and which can only be reached over those intervening.

Having thus described the present invention, its use and operation it should be understood that various changes in form and construction of parts may be made and substituted for those hereinbefore set forth without in the least departing from the spirit of the invention. For example, while a cylindrical structure is shown it is obvious that square or fanciful shapes may be assumed by the meat receptacle without materially altering its operation or impairing its usefulness.

What I claim therefore, and desire to secure by Letters Patent is:

1. In a cooking utensil the combination with a meat receptacle, of a plunger within said receptacle, a removable double ratchet bar bearing loosely upon the plunger aforesaid, a removable cover for said receptacle broken by an aperture of greater cross sectional area than the greatest cross sectional area of the ratchet bar projecting upward therethrough, a lever-fulcrum carried by said cover, a removable hand lever provided with means for engaging the said fulcrum and also with means for engaging one set of ratchet bar teeth to forcibly depress said bar, and a ratchet pawl upon the cover aforesaid for engaging the second set of ratchet bar teeth and when so engaged to prevent upward movement thereof.

2. In a cooking utensil the combination with a meat receptacle, of a plunger within said receptacle, a removable double faced ratchet bar bearing loosely upon the plunger aforesaid, a removable cover for said receptacle broken by an aperture of greater cross sectional area than the greatest cross sectional area of the ratchet bar projecting upward therethrough, a removable hand lever fulcrumed upon the cover aforesaid and provided with a pawl for engaging one set of teeth upon said ratchet bar to forcibly depress the bar, and a ratchet pawl upon the receptacle cover for engaging the other set of ratchet bar teeth and when so engaged to prevent upward movement thereof.

3. In a cooking utensil the combination with a meat receptacle having a top cover adapted to be secured thereon and a removable bottom, of a plunger within said receptacle, a double ratchet bar passing loosely through the cover and bearing upon the plunger aforesaid, a pair of parallel lugs rising from said receptacle cover, a pawl pin connecting said lugs and projecting upon both sides thereof, a ratchet pawl upon said pin adapted to engage one set of ratchet bar teeth to prevent upward movement, a bifurcated hand lever adapted to fulcrum beneath the projecting ends of said pawl pin, and a pawl pivotally secured between the bifurcated members of the lever aforesaid so as to engage the second set of ratchet bar teeth to forcibly depress the ratchet bar.

4. In a cooking utensil the combination with a meat receptacle, of a plunger within said receptacle, a removable presser bar bearing loosely upon the plunger aforesaid and provided with ratchet teeth, a removable cover for said receptacle broken by an aperture of greater cross sectional area than the greatest cross sectional area of the said presser bar projecting upward therethrough, a lever-fulcrum carried by said cover, a detached hand lever provided with means for engaging said fulcrum and also with means for engaging said presser bar to forcibly depress it, and a ratchet pawl upon the cover aforesaid for engaging teeth upon the presser bar and when so engaged to prevent upward movement thereof.

5. In a cooking utensil the combination with a meat receptacle, of a plunger within said receptacle, a removable presser bar bearing loosely upon the plunger aforesaid, a removable cover for said receptacle broken by an aperture of greater cross sectional area than the greatest cross sectional area of the presser bar projecting upward therethrough, a lever-fulcrum carried by said cover, a detached hand-lever provided with means for engaging said fulcrum and also with means for engaging said presser bar to forcibly depress it, and a detent carried by the receptacle cover for engaging the presser bar to prevent accidental upward movement thereof.

In testimony whereof I affix my signature, in presence of two subscribing witnesses.

EMIL SCHMID.

Witnesses:
WM. E. DYRE,
CHARLES LOWELL HOWARD.